United States Patent [19]
Robinson et al.

[11] 3,981,325
[45] Sept. 21, 1976

[54] TANK TRUCK VENT SYSTEM

[75] Inventors: Bernie E. Robinson; Daniel T. Robinson, both of Milwaukee, Wis.

[73] Assignee: Milwaukee Valve Company, Inc., Milwaukee, Wis.

[22] Filed: Oct. 20, 1975

[21] Appl. No.: 623,747

[52] U.S. Cl. .............................................. 137/587
[51] Int. Cl.² ......................................... F16K 45/02
[58] Field of Search ........... 137/583, 587, 267, 136, 137/143, 144, 217; 251/144

[56] References Cited
UNITED STATES PATENTS

| | | | |
|---|---|---|---|
| 1,591,726 | 7/1926 | Neuls | 137/587 |
| 2,301,821 | 11/1942 | Scott | 137/587 X |
| 2,313,846 | 3/1943 | Tamminga | 137/587 X |
| 3,095,894 | 7/1963 | Jensen | 137/267 |
| 3,149,642 | 9/1964 | Marx | 137/587 X |
| 3,486,528 | 12/1969 | Frees | 137/587 |

*Primary Examiner*—William R. Cline

[57] ABSTRACT

A vent system includes a spring-loaded closed vent valve mounted in the upper portion of the truck tank and a spring-loaded closed safety valve mounted in the bottom of the tank. The safety valve has a discharge portion carrying an actuator pin which disengagably abuts the underside of the safety valve member and is actuated to lift the valve member to permit flow of gasoline from or into the tank. The vent valve member is operatively connected to the safety valve member by an actuating rod so that the vent valve is opened or closed when the safety valve is opened or closed. The safety valve, actuating rod and vent valve are provided with an overboard vent passage which extends from an inlet in the safety valve member to an outlet in the vent valve member. When the actuator pin is actuated to open the safety valve, the inner end of the pin covers the vent passage inlet and vapors are vented from the tank through the vent valve in a normal manner. When the safety valve is closed, a small spring carried on the actuator pin urges the inner end of the actuator pin away from the safety valve member, thereby opening the vent passage so that the discharge portion of the safety valve is vented overboard. This eliminates the vacuum effect normally created in a discharge conduit connected to the safety valve, permitting it to be gravity drained after the safety valve has been closed.

7 Claims, 3 Drawing Figures

TANK TRUCK VENT SYSTEM

BACKGROUND OF THE INVENTION

Tank trucks, particularly those used for transporting inflammable liquids, such as gasoline, typically include a dump hose which is connected to a discharge conduit or manifold mounted on the bottom of the tank for unloading or loading. A manually operated valve, such as a gate valve or a lever-operated faucet, is located in the discharge conduit for shutting off flow of the liquid from or into the tank. A safety valve is located in each tank compartment at the inlet to the discharge conduit as a safety measure in the event the discharge conduit is accidentally ruptured or broken away, such as during a collision. The safety valve usually is manually opened for unloading or loading, but as a rule, is not designed to control flow. A shutoff valve is used for this purpose and the safety valve is closed after flow has been shut off by closing the shutoff valve. Consequently, a quantity of the liquid (i.e., several gallons for larger systems) is trapped in the discharge conduit between the safety valve and the shutoff valve. Tank trucks often travel with this so-called "wet line." Needless to say, this trapped liquid represents a potential fire hazard in the event the discharge conduit is accidentally ruptured during a collision.

The discharge conduit can be partially drained by opening a shutoff valve after the safety valve has been closed. However, the vacuum effect created between the safety valve and the head of the liquid column, as the liquid starts to drain, prevents the discharge conduit from being completely emptied by gravity. This vacuum effect can be eliminated by venting the discharge conduit below the safety valve. However, safety regulations require that the vapors of inflammable liquids, such as gasoline, be vented into the storage tank or the supply tank to which the tank truck is connected.

SUMMARY OF THE INVENTION

A principal object of the invention is to provide a simple system which is capable of venting the discharge conduit of a tank truck so it can be easily and completely emptied after the safety valve is closed and still meet safety regulations for venting vapors of an inflammable liquid.

Another object of the invention is to provide such a system which is arranged to automatically vent the discharge system upon closure of the safety valve.

Other objects, aspects and advantages of the invention will become apparent upon reviewing the following detailed description, the drawing and the appended claims.

The vent and safety valve system provided by the invention includes a vent valve mounted on an upper portion of the tank and having a seat, a valve member mounted for movement relative to the seat between opened and closed positions, and means for urging the valve member towards a closed position, and a safety valve mounted on a lower portion of the tank and having an inner portion located inside the tank, a discharge portion, a seat, a valve member mounted for movement relative to the seat between opened and closed positions, and means for urging the valve member towards the closed position. Located inside the discharge portion of the safety valve is a movable actuator pin which is disengagably connected to the safety valve member for selectively moving it to the open position. The valve members of both the vent valve and the safety valve are operatively connected by an actuating rod so that, when the safety valve is moved to the open position by actuation of the safety valve actuator pin, the vent valve is also opened and, when the safety valve is closed, the vent valve is also closed. An overboard vent passage is provided through the safety valve member, the actuating rod, and the vent valve member for venting the discharge portion of the safety valve when both the vent valve and the safety valve are closed. The inner end of the safety valve actuator pin covers the vent passage inlet when the actuator pin is moved to a position to open the safety valve. Biasing means, such as a small coil spring, is provided on the actuator pin for urging the pin away from the safety valve member when the safety valve is closed.

With this arrangement, the overboard vent passage is opened after the safety valve is closed and the portion of the safety valve downstream of the seat and the discharge conduit connected thereto are automatically vented upon closure of the safety valve and thereafter can be gravity drained.

The discharge portion of the safety valve preferably is provided with a weakened section near the safety valve seat so that, in the event the discharged portion and/or components attached thereto is struck with a hard force, the discharge portion and the actuator pin can separate and fall away. Thus, the entire actuating mechanism separates from the safety valve member and there is no interference to valve closure.

DESCRIPTION OF THE PREFERRED EMBODIMENTS

Figure 1:
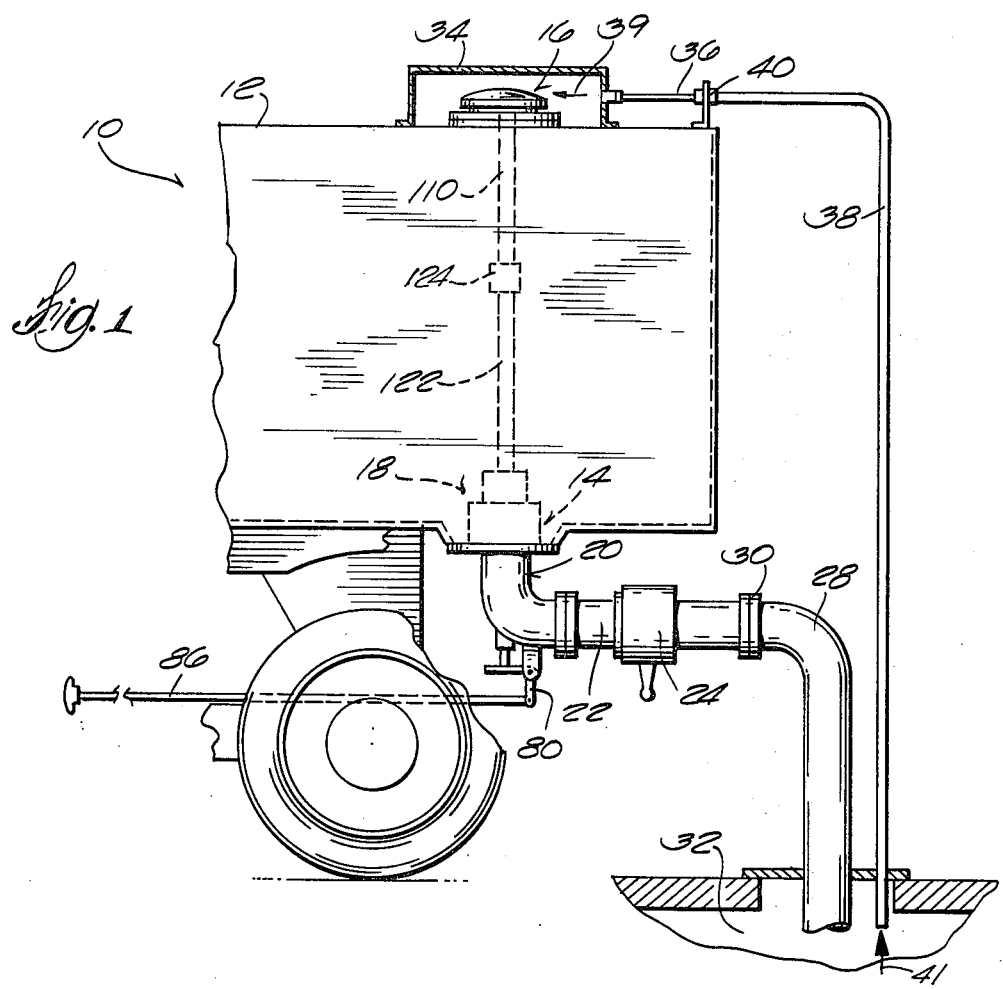
FIG. 1 is a fragmentary, side elevational view of a tank truck incorporating a venting system of the invention.

Illustrated in FIG. 1 is a tank truck 10 including a tank 12 for transporting an inflammable liquid, such as gasoline, a safety valve 14 mounted in the bottom of the truck tank and a vent valve 16 mounted in the top of the truck tank.

The safety valve 14 includes an inner or upper portion 18 which is located inside the truck tank 12 and a lower or discharge portion 20 which depends from the truck tank and extends rearwardly. A discharge conduit 22 including a conventional, manually-operated shutoff valve, such as a lever-operated faucet 24, is attached to a flange 26 provided on the discharge portion 20. A flexible hose 28 is removably connected to the outlet of the discharge conduit 22, such as by a standard disconnect fitting 30, for unloading gasoline from the truck tank into an underground storage tank 32 (shown fragmentarily in FIG. 1). The truck tank also can be loaded from a supply tank through the hose 28.

The vent valve 16 is mounted in communication with a hole provided in the top of the truck tank 12 and is covered by a vapor tight shroud or hood 34 mounted on the truck tank. A vent conduit 36 is connected to the hood 34 and a flexible outboard vent hose 38 is removably connected to the outlet of the vent conduit 36, such as by a standard disconnect fitting 40, for venting the truck tank 12 to the storage tank or the supply tank to which the truck tank is connected for unloading or loading. In FIG. 1, the overboard vent hose 38 is shown extending into the storage tank 32 so that vapors from the top portion of the storage tank 32 are admitted into the truck tank 12 during unloading (as illustrated by arrows 39 and 41) to facilitate gravity draining of the truck tank.

Figure 2:
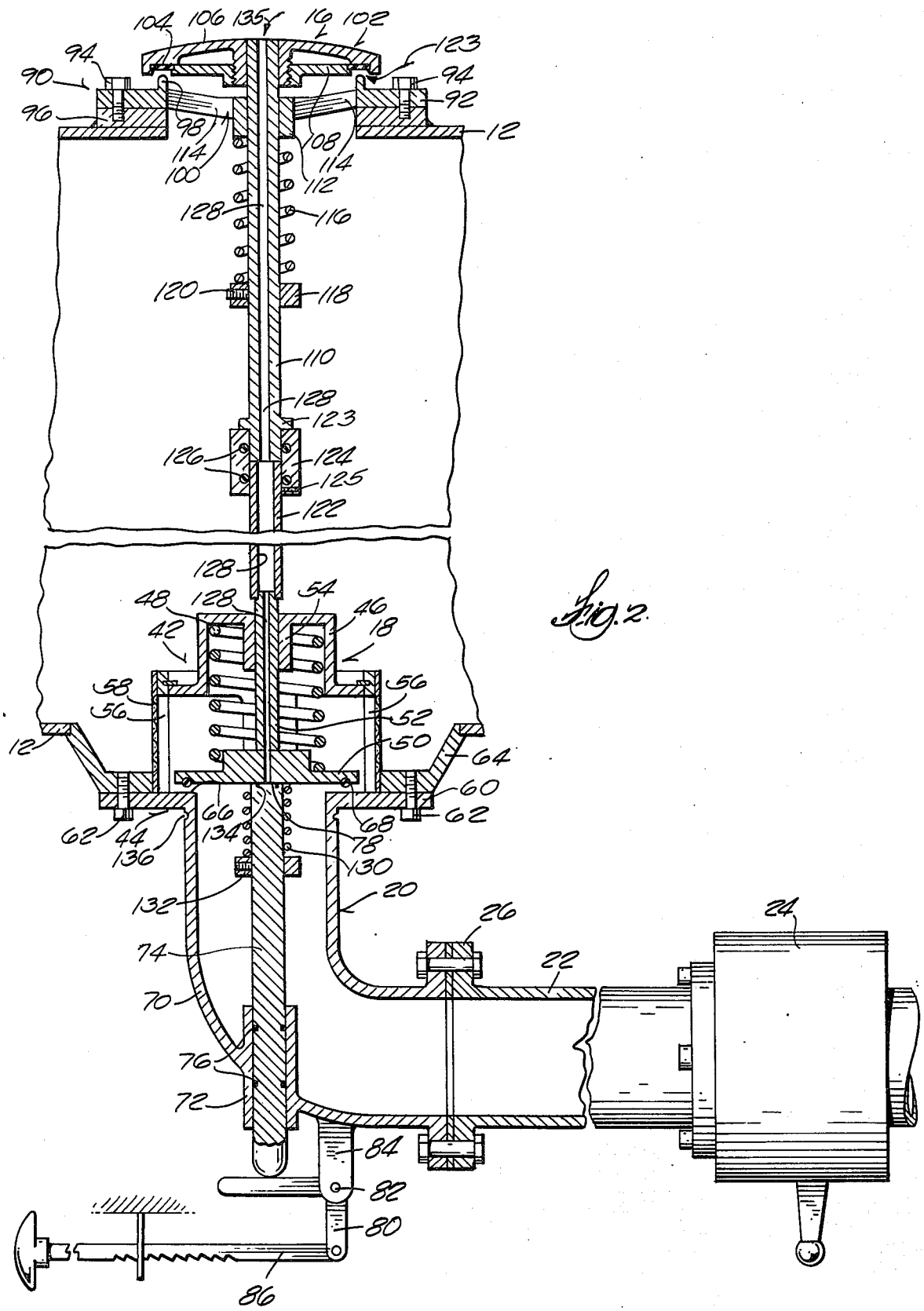
FIG. 2 is an enlarged, fragmentary view of the discharge conduit of the tank truck, a vertical cross sectional view of the safety valve and a vertical cross sectional view of the vent valve shown in FIG. 1.

More specifically, referring to FIG. 2, the safety valve 14 has a body including an upper housing portion 42 and a base portion 44. The upper housing portion 42 includes a cap 46 and houses a compressed coil spring 48 having an upper end bearing against the cap 46 and a lower end acting on the top of a generally circular disc or valve member 50. The valve member 50 is supported for reciprocative movement by a guide stem 52 disposed inside the spring 48 and slidably extending through a bushing or guide 54 provided in the cap 46. The upper housing portion 42 includes a plurality of apertures 56 opening into the truck tank 12. The apertures 56 preferably are covered by a filter screen 58.

The base portion 44 includes a radially extending mounting flange 60 permitting the safety valve 14 to be removably fastened, such as by bolts 62, to the underside of a thickened sump 64 provided in the bottom of the truck tank 12. Located in the base portion 44 is a flat-surfaced valve seat 66 facing the upper housing portion 42 and against which the valve member 50 is sealingly urged by the spring 48 to shut off flow from or into the truck tank. The valve member 50 preferably is provided with an O-ring type sealing ring 68 which effects a fluid tight seal with a valve seat 66 when the valve member 50 is in the closed position.

Extending from the base 44 is an outlet elbow 70 including a bushing or guide 72 for slidably receiving an elongated, valve actuator pin 74. Leakage between the guide 72 and the actuator pin 74 is prevented by one or more O-rings 76 carried by the actuator pin. The inner end 78 of the actuator pin 74 is adapted to abuttingly engage the valve member 50 (by moving the actuator pin inwardly) so that the valve member can be lifted or unseated against the biasing force of the spring 48, as shown in FIG. 2, to permit flow through the safety valve. When the valve member 50 is unseated, liquid flows from the truck tank 12 into the outlet elbow 70 through the apertures 56 and past the seat 66.

The actuator pin 74 is actuated by a bell crank 80 pivoted at 82 on a support bracket 84 fixedly attached to the outlet elbow 70. The bell crank 80 is actuated by a suitable means, such as a rod 86, which preferably is toothed to retain the valve member in an open position. This permits the operator to keep the safety valve open and control the flow of liquid from the truck tank with the shutoff valve 24.

The vent valve 16 has a body including a base portion 90 having a radially extending mounting flange 92 permitting the vent valve to be removably fastened, such as by bolts 94, to a mounting flange 96 provided on the top of the truck tank 12. Located in the base portion 90 is an upstanding, annular valve seat 98 and a plurality of apertures 100 opening into the truck tank. Normal venting of the truck tank is controlled by a valve member 102 including an annular sealing member or disc 104 carried by a disc holder 106 and held in place by a disc nut 108 threaded onto the disc holder. The valve member 102 is supported for reciprocative movement by a guide stem 110 connected at one end to the disc holder 106 and slidably extending through bushing or guide 112 in the base portion 90. The interior of the base portion 90 preferably is in the form of a spider with the guide 112 forming the hub and a plurality of legs 114 extending radially therefrom to define the flow passage openings 100.

A compressed coiled spring 116 encircling the guide stem 110, with one end bearing against the underside of the guide 112 and the other end bearing against a collar 118 mounted on the guide stem, such as by a set screw 120, urges the disc 104 of the valve member 102 into a sealing engagement with the valve seat 98.

The upper end of the safety valve guide stem 52 is connected to the lower end of the vent valve guide stem 110 by a rigid actuating rod 122 so that, anytime the safety valve 14 is opened (by inward movement of safety valve actuator pin 74) the vent valve 16 is also opened and, conversely, anytime the safety valve is closed, the vent valve is also closed. Thus, the truck tank 12 is automatically vented through the vent valve 16 the vent conduit 36, and the overboard vent hose 38 anytime the safety valve 14 is open during unloading or loading. When the truck tank 12 is being unloaded, vapors from the storage tank 32 are admitted into the truck tank through the vent valve 16 as illustrated by arrow 123 in FIG. 2. During loading of the truck tank 12, vapors are vented therefrom in the opposite direction.

For some applications, the distance between the safety valve 14 and the vent valve 16 can be several feet. Consequently, manufacturing tolerances can result in some variation in the length of the actuating rod 122 required to provide a solid link between the guide stems of the safety valve and the vent valve. In order to accommodate manufacturing tolerances, a sleeve 124 may be used to provide a fluid tight coupling between one end of the actuating rod 122 and one of the guide stems. In the specific construction illustrated, the sleeve 124 couples the upper end of the actuating rod 122 to the lower end of the vent valve guide stem 110 and the other end of the actuating rod 122 is attached to the upper end of the safety valve guide stem 52.

For assembly, the sleeve 124 is slipped over the upper end of the actuating rod 122 and, after the actuating rod 122 is aligned with the vent valve guide stem 110, the sleeve 124 is slipped over the lower end of the vent valve guide stem 110 and pushed against a shoulder or collar 123 provided on the vent valve guide stem 110. A set screw 125 provided in the lower portion of the sleeve 124 is then tightened until it bites into the outer wall of the actuating rod 122 to complete a fixed coupling between the actuating rod 122 and the vent valve guide stem 110. The sleeve 124 preferably is provided with a pair of O-rings to provide a fluid tight seal with both the vent valve guide stem and the actuator rod. With this arrangement, a fluid tight, solid link is provided between the actuator rod and the vent valve guide stem even though the adjacent ends thereof do not abut. As shown in FIG. 2, the actuating rod 122 preferably is a relatively thin-walled tubular member.

During normal unloading or loading operations, the shutoff valve 24 is closed to shut off flow and the safety valve 14 is thereafter closed by moving the actuator pin 74 outwardly, via operation of the rod 86, so that the spring 48 can urge the safety valve member 50 into sealing engagement with the valve seat 66. A quantity of gasoline ordinarily will be trapped in the discharge conduit 22 between the shutoff valve 24 and the safety valve 14 during loading, and during unloading when the tank is not completely emptied. Even though the shutoff valve 24 is subsequently opened, most of the trapped liquid cannot be gravity drained from the discharge conduit 22 because of the vacuum created in the upper portion of the outlet elbow 70 below the valve member 50.

To eliminate this problem, there is provided a vent passage 128 which extends axially through the safety valve member 50, the safety valve guide stem 52, the actuator rod 122, the vent valve guide stem 110 and the vent valve member 102. As shown in FIG. 2, the inlet to the vent passage 128, located in the safety valve member 50, is closed by the inner end 78 of the actuator pin 74 when the safety valve 16 is in the open position and the tank 12 is vented through the vent valve in a normal manner.

Mounted on the inner end portion of the actuator pin 74 is a small coil spring 130 with one end bearing against a collar 132 on the actuator pin 74 and the other end disengagably bearing against the underside of the safety valve member 50. The biasing force of the spring 130 acting on the underside of the valve member 50 is less than the biasing force of the spring 48 acting on the top of the valve member 50 so that the valve member is maintained in sealing engagement with the inner end 78 of the actuator pin 74 throughout all open positions of the safety valve 14. An O-ring 134 preferably is carried on the inner end 78 of the actuator pin 74 to insure a fluid tight seal between the actuator pin 74 and the valve member 50.

Figure 3:
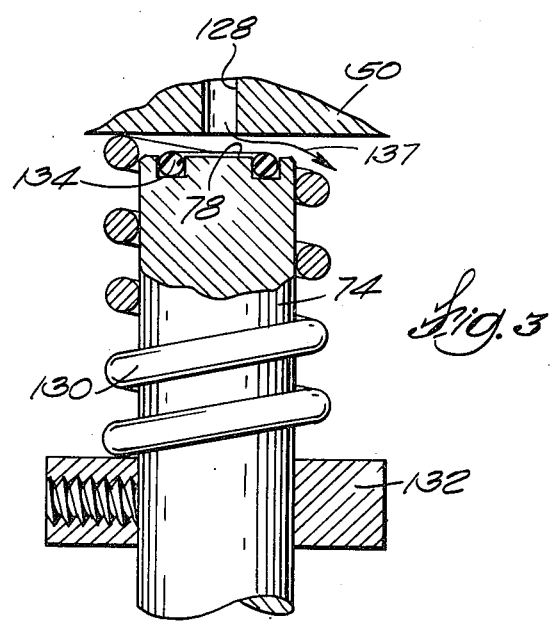
FIG. 3 is an enlarged, fragmentary, partially sectioned view of the safety valve actuator pin shown in a venting position when the safety valve is closed.

When the safety valve member 50 is in the closed position as shown in FIG. 3, the vent valve member 102 is urged to the closed position by the spring 116 and the spring 132 urges the inner end 78 of the actuator pin 74 away from the underside of the safety valve member 50. This permits vapors to be admitted from the storage tank 32 into the outlet elbow 20 via the vent line 38, the vent conduit 36, the hood 34 and the vent passage 128 as illustrated by arrow 135 in FIG. 2 and arrow 137 in FIG. 3.

With this arrangement, a closed loop system is provided for automatically venting the high point in the discharge conduit system when the safety valve is closed. Thus, after the safety valve 14 has been closed, the shutoff valve 24 can be reopened and the gasoline trapped in the discharge conduit 22 can be drained by gravity through the hose 28 into the storage tank 32.

The outlet elbow 70 preferably is provided with a circumferentially extending groove 136 located just below the flange 60. The groove 136 creates a weakened section which will break in the event the outlet elbow 70, the discharge conduit 22 or the shutoff valve 24 is accidentally struck with a relatively high impact force, such as during a collision. This allows the outlet elbow 70 to separate and fall away. The safety valve member 50 is closed or maintained in a closed position by the spring 48 since the actuator pin 74 and the spring 130 are disengagably connected to the valve member 50 and the actuator pin is carried by the outlet elbow in the bushing or guide. Even if the safety valve member is held open in transit, any force causing the outlet elbow to break away cannot cause much loss of contents from the tank because the valve member is promptly closed by the spring 48.

We claim:

1. A combination vent and safety valve system for a tank truck or the like comprising
   a vent valve including
     a body having a mounting flange permitting said vent valve to be mounted on an upper portion of the tank and an opening adapted to communicate with the inside of the tank,
     a valve seat in said vent valve body,
     a valve member mounted for movement relative to said vent valve seat between an open position to permit vapors to vent from the tank through said opening and a closed position in sealing engagement with said vent valve seat, and
     means for urging said vent valve member towards the closed position;
   a safety valve including
     a valve body having a mounting flange permitting said safety valve to be mounted on a lower portion of the tank, an inner portion to be located inside the tank, a discharge portion, and a flow passage adapted for communicating between the tank and said discharge portion,
     a valve seat,
     a valve member mounted for movement relative to said safety valve seat between an open position to permit fluid flow through said flow passage and a closed position in sealing engagement with said safety valve seat to prevent fluid flow through said flow passage,
     means for urging said safety valve member towards the closed position, and
     movable actuator pin means having an inner end located inside said safety valve discharge portion and disengagably connected to said safety valve member for selectively moving said safety valve member away from said safety valve seat to the open position;
   actuating rod means operatively connecting said vent valve member with said safety valve member such that, when said safety valve member is moved to the open position by movement of said safety valve actuator pin means, said vent valve member is also moved to the open position and, when said safety valve is moved to the closed position, said vent valve member is also moved to the closed position;
   a vent passage extending from an inlet in said safety valve member, through said actuating rod means and through said vent valve member for venting said safety valve discharge portion when both said vent valve and said safety valve are closed, said inner end of said actuator pin means being operable to close said vent passage inlet when said actuator pin is moved to a position to open said safety valve member; and
   means operatively and disengagably connecting said inner end of said safety valve actuator pin means with said safety valve member for urging said inner end of said safety valve actuator pin means away from said safety valve member to thereby open said vent passage inlet and permit said safety valve discharge portion to be vented through said vent passage when said safety valve actuator pin means is moved to a position for closing said safety valve member.

2. A combination vent and safety valve system according to claim 1 wherein
   said safety valve actuator pin means is slidably supported in said safety valve discharge portion, and said safety valve discharge portion includes a weakened section spaced from said safety valve seat for permitting the portion of said safety valve discharge portions supporting said safety valve actuator pin means to break away from the remainder of said safety valve in the event a predetermined force is applied to said safety valve discharge portion, thereby allowing said safety valve to close or remain closed as said separated discharge portion and said safety valve actuator pin means fall away.

3. A combination vent and safety valve system according to claim 1 wherein
said vent valve includes a hollow, elongated stem defining a portion of said vent passage, said vent valve stem extending towards said safety valve and having an outer end connected to said vent valve member and an inner end,
said safety valve includes a hollow, elongated stem defining a portion of said vent passage, said safety valve stem extending towards said vent valve and having an outer end connected to said safety valve member and an inner end, and
said actuating rod means, at one end, is fixedly attached to the inner end of one of said vent valve stem and said safety valve stem and, at the other end, is fixedly coupled to the inner end of the other of said vent valve stem and safety valve stem by a sleeve extending over a portion of both in fluid tight relationship.

4. A combination vent and safety valve system according to claim 3 wherein
one end of said actuating rod means is fixedly attached to the inner end of said safety valve stem, and
said sleeve fixedly couples the inner end of said vent valve stem to one end of said actuating rod means.

5. A combination vent and safety valve system according to claim 4 wherein said actuating rod means is a relatively thin-walled tubular member.

6. A combination vent and safety valve system according to claim 1 wherein
said safety valve actuator pin means carries a sealing member on the inner end portion thereof for sealingly engaging said safety valve member when said actuator pin means is moved to a position to open said safety valve member.

7. A combination vent and safety valve system according to claim 1 wherein
said means for urging said safety valve actuator means away from safety valve member comprises a coil spring having one end supported on said safety valve actuator pin means and the other end disengagably bearing against said safety valve member.

* * * * *